United States Patent
Kim

(10) Patent No.: US 10,682,947 B2
(45) Date of Patent: Jun. 16, 2020

(54) VEHICLE HIGH-BEAM LAMP CONTROL APPARATUS AND METHOD THEREFOR

(71) Applicant: Continental Automotive GmbH, Hannover (DE)

(72) Inventor: BongJoon Kim, Gyeonggi-do (KR)

(73) Assignee: Continental Automotive GmbH, Hannover ( * ) Notice: Subject to any disclaimer, the term of this patent is extended or adjusted under 35 U.S.C. 154(b) by 316 days.

(21) Appl. No.: 15/766,308

(22) PCT Filed: Oct. 5, 2016

(86) PCT No.: PCT/EP2016/073795
§ 371 (c)(1),
(2) Date: Apr. 5, 2018

(87) PCT Pub. No.: WO2017/060302
PCT Pub. Date: Apr. 13, 2017

(65) Prior Publication Data
US 2018/0290585 A1 Oct. 11, 2018

(30) Foreign Application Priority Data
Oct. 6, 2015 (KR) .................. 10-2015-0140304

(51) Int. Cl.
*B60Q 1/14* (2006.01)
*B60Q 11/00* (2006.01)

(52) U.S. Cl.
CPC ......... *B60Q 1/1453* (2013.01); *B60Q 1/1423* (2013.01); *B60Q 11/00* (2013.01)

(58) Field of Classification Search
CPC .... B60Q 1/1469; B60Q 1/1423; B60Q 1/143; B60Q 1/46; B60Q 2300/056; B60Q 2300/42
See application file for complete search history.

(56) References Cited

U.S. PATENT DOCUMENTS 5,075,593 A * 12/1991 Shoda .................. B60Q 1/1415
307/10.8
6,014,207 A * 1/2000 Suzuki ................ B60Q 1/1423
315/77

(Continued)

FOREIGN PATENT DOCUMENTS

EP 0989025 A1 3/2000
EP 1977929 A1 10/2008

(Continued)

OTHER PUBLICATIONS

International Search Report and Written Opinion dated Dec. 13, 2016 from corresponding International Patent Application No. PCT/EP2016/073795.

*Primary Examiner* — Daniel Kessie

(57) ABSTRACT

Disclosed are a vehicle high-beam lamp control apparatus and a method therefor. The vehicle high-beam lamp control apparatus comprises a passing switch (10) which, after having been turned on by means of a physical force from a user, is turned off while being restored; a high-beam switch (20) for turning the high-beam lamp (40) on and off; and a control unit (30) which switches on and off the high-beam lamp (40) in accordance with an on/off state of the passing switch (10) and the high-beam switch (20), and which switches off the high-beam lamp (40) if, after the passing switch (10) has been turned on, the passing switch (10) is not turned off such that a first set time is exceeded, and also switches off the high-beam lamp (40) if the passing switch (10) is turned on when the high-beam switch (20) is in the turned on state.

8 Claims, 2 Drawing Sheets

(56) References Cited

U.S. PATENT DOCUMENTS

| | | | | |
|---|---|---|---|---|
| 6,179,455 | B1* | 1/2001 | Taniuchi | B60Q 1/1438 |
| | | | | 362/280 |
| 8,125,101 | B1* | 2/2012 | Jaworski | B60Q 1/1407 |
| | | | | 307/10.8 |
| 2005/0039969 | A1* | 2/2005 | Laukkanen | B60K 37/06 |
| | | | | 180/333 |
| 2008/0088427 | A1* | 4/2008 | Martin | B60Q 1/1423 |
| | | | | 340/468 |
| 2009/0010494 | A1* | 1/2009 | Bechtel | B60Q 1/1423 |
| | | | | 382/104 |
| 2013/0294100 | A1* | 11/2013 | Ishizaki | B60Q 1/143 |
| | | | | 362/465 |
| 2014/0029277 | A1* | 1/2014 | Hartmann | B60Q 1/143 |
| | | | | 362/465 |
| 2015/0049504 | A1* | 2/2015 | Wu | F21S 41/19 |
| | | | | 362/517 |
| 2016/0180707 | A1* | 6/2016 | MacNeille | B60W 40/04 |
| | | | | 701/117 |
| 2017/0072837 | A1* | 3/2017 | Ueno | B60Q 11/00 |
| 2017/0349093 | A1* | 12/2017 | Peacock | B60Q 1/46 |

FOREIGN PATENT DOCUMENTS

| | | |
|---|---|---|
| EP | 2669115 A1 | 12/2013 |
| JP | 20055297818 A | 10/2005 |
| KR | 200124651 Y1 | 8/1998 |
| KR | 2019990027164 | 7/1999 |

* cited by examiner

[Fig 1]
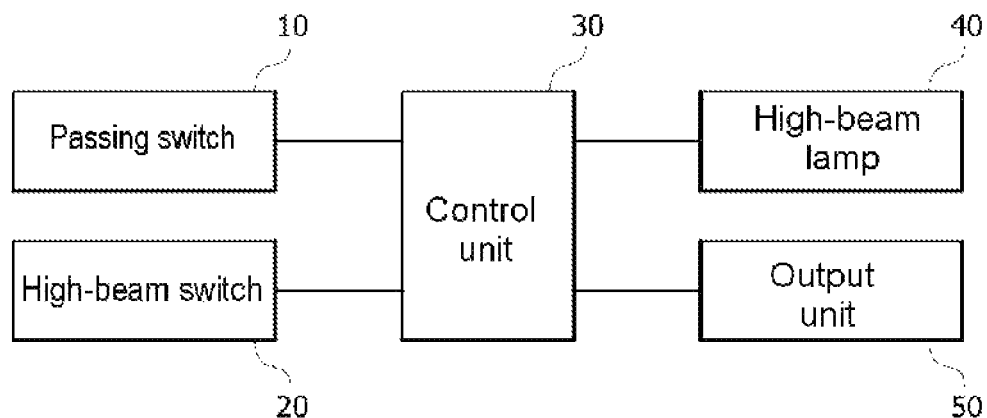
[Fig 2]
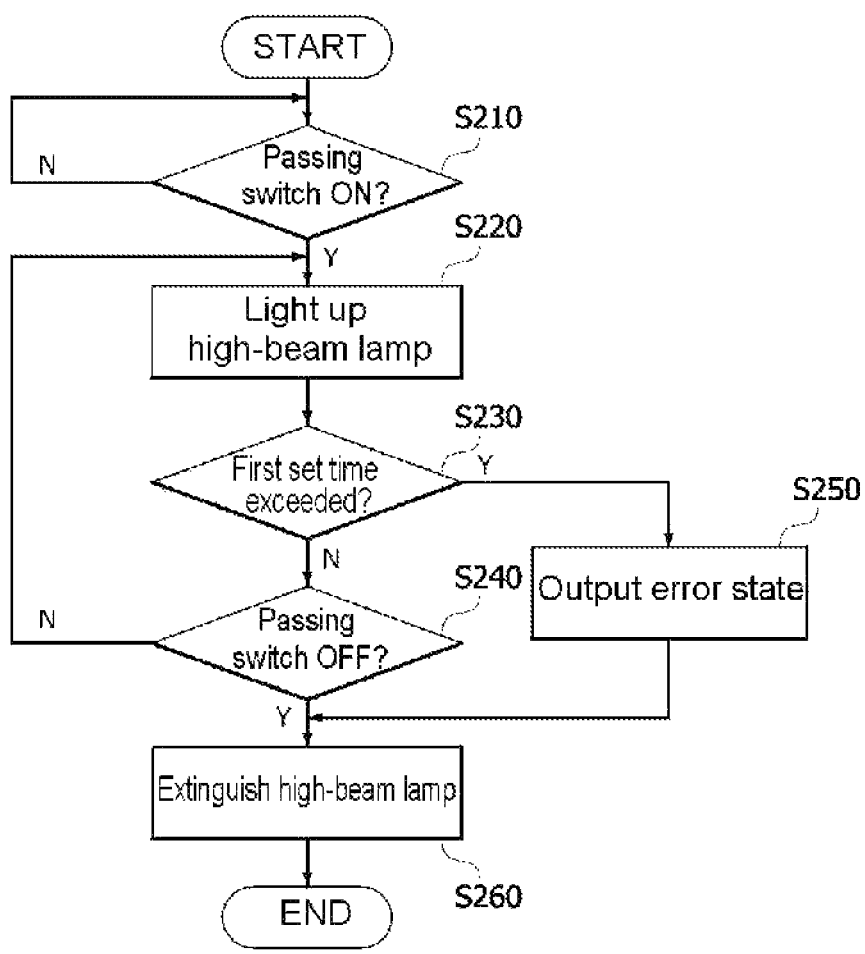

[Fig 3]
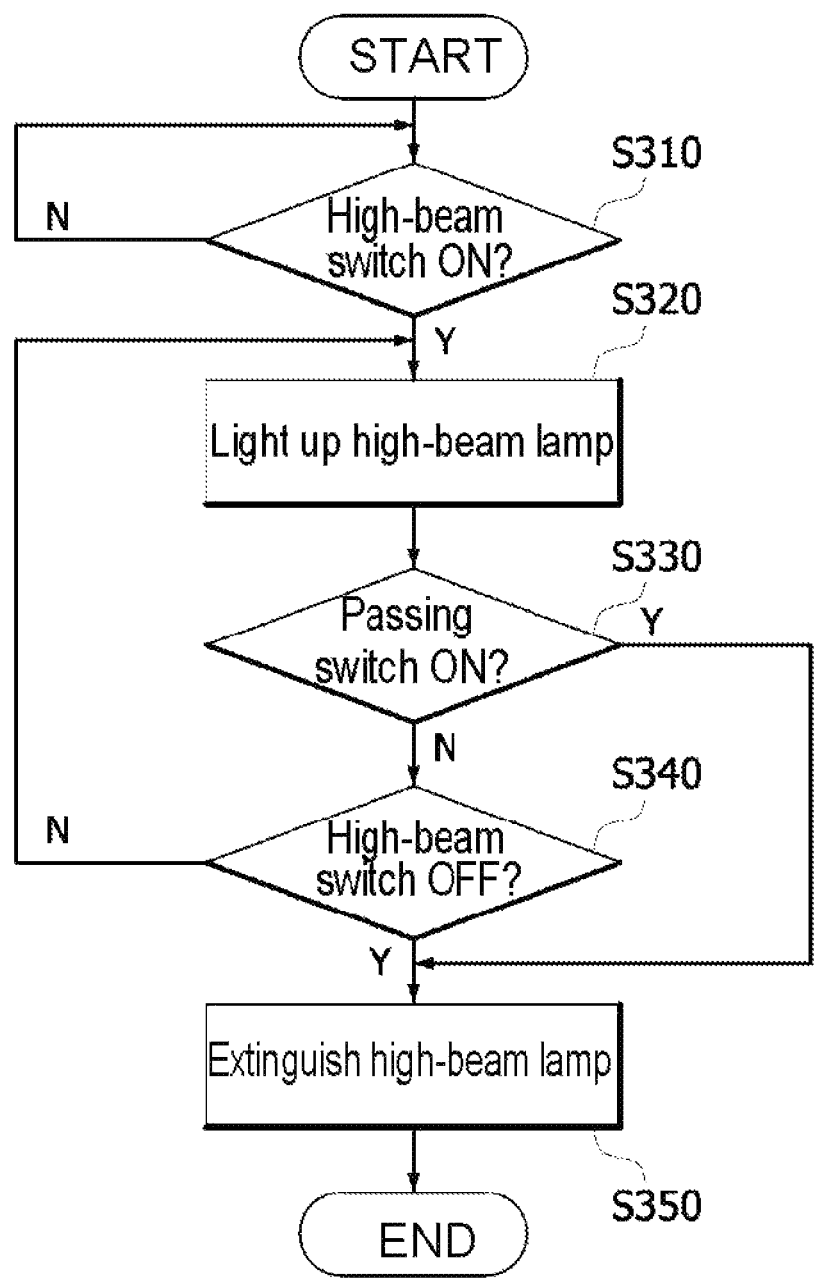

VEHICLE HIGH-BEAM LAMP CONTROL APPARATUS AND METHOD THEREFOR

The present invention relates to a vehicle high-beam lamp control apparatus and to a method therefor. More specifically, the invention relates to a vehicle high-beam lamp control apparatus whereby a high-beam lamp can be switched off when the high-beam lamp has not been switched off due to faulty operation of a passing switch or of a high-beam switch on the vehicle, and a method therefor.

In general, lighting devices in vehicles can be broadly divided into two types based on functionality. Firstly, there is an illumination function intended to render objects visible, and secondly, there is a signalling function intended to inform other vehicles or other road users about the current state of one's own vehicle.

For example, headlamps and fog lamps are lights intended for illumination, while direction-indicator lamps, tail lamps, brake lamps and the like are intended for signalling.

Headlamps intended for illumination are lights for illuminating the way ahead in order to ensure that the vehicle progresses safely at night, and typically comprise a light unit incorporating a bulb, reflector and lens together with an adjusting apparatus whereby the light unit is attached to the vehicle chassis.

Further, headlamps are divided into high-beam lamps for illuminating the way ahead for a long distance and low-beam lamps for illuminating a short distance.

At the same time, high-beam lamps can also be used for the purpose of signalling by repeatedly turning on and off a passing switch in order to give an alert to an oncoming vehicle or a vehicle in front.

By way of example, a vehicle high-beam lamp control apparatus is disclosed in Korean Laid-Open Utility Model Gazette No. 20-1999-0027164 (15 Jul. 1999).

Hence, high-beam lamps are used with an illumination function for illuminating the way ahead and with a signalling function for giving an alert to oncoming traffic.

In order to operate this, either the high-beam lamp is switched on and off by turning a high-beam switch on and off, respectively, or else the high-beam lamp is switched on and off by turning a passing switch on and off.

However, if faulty operation occurs due to an unknown circuit defect after having switched on the high-beam lamp by turning the passing switch on, then a situation occurs in which this is not recognised and the high-beam lamp is not switched off even when the passing switch is turned off.

Further, if faulty operation occurs after having switched on the high-beam lamp by turning the high-beam switch on, then a situation occurs in which the high-beam lamp is not switched off and the switched on state is maintained even when the high-beam switch is turned off.

If the high-beam lamp is not switched off due to faulty operation after having been switched on by means of the passing switch or the high-beam switch in this way, then this can induce dazzle in drivers in traffic in front or drivers in oncoming traffic and thus there is an increased accident risk.

The present invention has been devised in order to improve upon problems such as the above, and an object of the present invention is thus to provide a vehicle high-beam lamp control apparatus whereby a switched on time is set such that the high-beam lamp can be forcibly switched off if same has not been switched off due to faulty operation of a passing switch of the vehicle and a method therefor.

Another object of the present invention is to provide a vehicle high-beam lamp control apparatus whereby the high-beam lamp can be switched off by means of the passing switch if the high-beam lamp has not been switched off due to faulty operation of a high-beam switch of the vehicle and a method therefor.

According to one aspect of the present invention, a vehicle high-beam lamp control apparatus comprises a passing switch configured to be recovered and turned off after having been turned on by means of a physical force from a user; a high-beam switch configured to turn on and off a high-beam lamp; and a control unit configured to switch on and off the high-beam lamp in accordance with an on/off state of the passing switch and the high-beam switch, respectively, and which is configured to switch off the high-beam lamp if, after the passing switch has been turned on, the passing switch is not turned off such that a first set time is exceeded, i.e. which is configured to switch off the high-beam lamp if, after the passing switch has been turned on, the passing switch is not turned off within the first set time, and which is additionally configured to switch off the high-beam lamp if the passing switch is turned on when the high-beam switch is in the turned on state.

In an embodiment of the present invention, the control unit further comprises an output unit configured to output an error state if the high-beam lamp has been switched off because the first set time was exceeded with the passing switch in the on state.

In a further embodiment of the present invention, the control unit is configured to switch off the high-beam lamp if the passing switch is turned on continuously for more than a second set time when the high-beam switch is in the turned on state.

According to another aspect of the present invention, a vehicle high-beam lamp control method comprises a step in which a control unit switches on a high-beam lamp upon sensing an on state of a passing switch; a step in which, following the switching on of the high-beam lamp, the control unit judges whether a first set time has been exceeded; a step in which, if the result of the judgment as to whether the first set time has been exceeded is that the first set time has been exceeded, the control unit switches off the high-beam lamp; and a step in which, if the result of the judgment as to whether the first set time has been exceeded is that the first set time has not been exceeded, the control unit switches off the high-beam lamp upon sensing that the passing switch is in an off state.

In an embodiment of the present invention, the step in which the control unit switches off the high-beam lamp if the first set time has been exceeded further comprises a step in which the control unit outputs a passing-switch error state.

According to yet another aspect of the present invention, a vehicle high-beam lamp control method comprises a step in which a control unit switches on a high-beam lamp upon sensing an on state of a high-beam switch; a step in which, following the switching on of the high-beam lamp, the control unit senses an on state of a passing switch, i.e. a step in which the control unit determines if the passing switch is in the on state; a step in which, if the result of sensing the on state of the passing switch is that the passing switch is in the on state, the control unit switches off the high-beam lamp; and a step in which, if the result of sensing the on state of the passing switch is that the passing switch is in an off state, the control unit switches off the high-beam lamp upon sensing an off state of the high-beam switch.

In an embodiment of the present invention, in the step in which the control unit senses the on state of the passing switch, the on state of the passing switch is sensed, i. e. the control unit determines that the passing switch is in the on state and the result of sensing the on state of the passing switch is that the passing switch is in the on state, in other words, the on state of the passing switch is confirmed and the passing switch is regarded as being on or activated, when the on state of the passing switch continues for more than a second set time.

In the vehicle high-beam lamp control apparatus according to the present invention and the method therefor, a switched on time, i.e. an on-time during which the high-beam lamp is switched on, is set such that the high-beam lamp can be forcibly switched off if the high-beam lamp has not been switched off due to faulty operation of the passing switch on the vehicle, thereby making it possible to eliminate dazzling of drivers in traffic in front and in oncoming traffic due to switching on of the high-beam lamp, and so making it possible to reduce the risk of accidents.

Further, according to the present invention, the high-beam lamp can be switched off by means of the passing switch if the high-beam lamp has not been switched off due to faulty operation of the high-beam switch on the vehicle, thereby making it possible to eliminate dazzling of drivers in traffic in front and in oncoming traffic due to switching on of the high-beam lamp, and so making it possible to reduce the risk of accidents. The invention will be described in further detail with reference to the accompanying drawings in which FIG. 1 is a block diagram illustrating a vehicle high-beam lamp control apparatus according to an embodiment of the present invention;

FIG. 2 is a flow chart intended to explain a vehicle high-beam lamp control method according to an embodiment of the present invention; and FIG. 3 is a flow chart intended to explain a vehicle high-beam lamp control method according to another embodiment of the present invention.

It is noted that features such as the thicknesses of lines and the sizes of constituent elements depicted in the drawings may be shown in an exaggerated fashion for reasons of convenience and clarity of explanation. Further, items of vocabulary mentioned below have been defined with reference to functioning in the present invention and may be different from convention. Hence, the definitions of such vocabulary items should be made based on the content across the whole of the present specification.

FIG. 1 is a block diagram illustrating a vehicle high-beam lamp control apparatus according to an embodiment of the present invention.

As illustrated in FIG. 1, the vehicle high-beam lamp control apparatus according to this embodiment of the present invention comprises, notably, a passing switch 10, a high-beam switch 20 and a control unit 30, as well as an output unit 50.

The passing switch 10 is a switch which, after having been turned on by means of a physical force from a user, is recovered and turned off, and this passing switch 10 can be used for the purpose of signalling with a high-beam lamp 40 being switched on and off when the passing switch 10 is repeatedly turned on and off, respectively, in order to give an alert to an oncoming vehicle or a vehicle in front.

The high-beam switch 20 is a switch for turning the high-beam lamp 40 on and off and is different from the passing switch 10.

The high-beam switch 20 is normally used in order to turn on and off the high-beam lamp 40 in order to illuminate the way ahead for a long distance.

The control unit 30 switches on and off the high-beam lamp 40 depending on an on/off state of the passing switch 10 and the high-beam switch 20, respectively.

Also, if, after the passing switch 10 has been turned on, the passing switch 10 does not turn off such that a first set time is exceeded, the control unit 30 switches off the high-beam lamp 40.

The passing switch 10 is a switch which is used for the purpose of signalling, and this switch is normally used to repeat an action of turning on/off for between 2 and 3 seconds. However, if the passing switch 10 does not turn off such that the first set time is exceeded, then the control unit 30 makes a judgment that the off state of the passing switch 10 has not been recognised due to faulty operation of the passing switch 10 and forcibly switches off the high-beam lamp 40.

In this embodiment, if the first set time is set at 3 seconds, then, following switching on of the high-beam lamp 40 due to the passing switch 10 being turned on, the high-beam lamp 40 will be switched off if it is not sensed that the passing switch 10 is off even after 3 seconds have been exceeded.

The output unit 50 is configured to output an error state and inform the driver of same if the control unit 30 switches off the high-beam lamp 40 because the first set time has been exceeded with the passing switch 10 in the on state.

Consequently, the control unit 30 outputs an error state of the passing switch 10 via the output unit 50 if the high-beam lamp 40 is forcibly switched off because of faulty operation of the passing switch 10 in this way.

Here, if an error state is output via the output unit 50, the driver can be informed of the error state of the passing switch 10 by displaying the error state of the passing switch 10 on an instrument cluster (not illustrated) or an infotainment system (not illustrated) of the vehicle.

Further, the control unit 30 switches off the high-beam lamp 40 if, after the high-beam switch 20 has been turned on, the passing switch 10 is turned on and it is not sensed that the high-beam switch 20 is off.

Normally, the high-beam switch 20 and the passing switch 10 are not used simultaneously, and thus the passing switch 10 can be used as a stratagem for resolving faulty operation of the high-beam switch 20.

Consequently, the control unit 30 switches off the high-beam lamp 40 if, with the high-beam switch 20 in the turned on state, the on state of the passing switch 10 is sensed continuously for more than a second set time.

Here, the second set time may be set at 3 seconds or more. More specifically, if the on state of the passing switch 10 is continuously sensed for 3 seconds or more with the high-beam switch 20 in the turned on state, then the control unit 30 makes a judgment that, despite the driver having turned the high-beam switch 20 off, the high-beam lamp 40 was not switched off and that as a fallback strategy the passing switch 10 was operated, and so switches off the high-beam lamp 40.

As described hereinabove, when the vehicle high-beam lamp control apparatus of an embodiment of the present invention is used, a switched on time is set such that the high-beam lamp can be forcibly switched off if the high-beam lamp has not been switched off due to faulty operation of the passing switch on the vehicle, or the high-beam lamp can be switched off by means of the passing switch if the high-beam lamp has not been switched off due to faulty operation of the high-beam switch, thereby making it possible to eliminate dazzling of drivers in traffic in front and in oncoming traffic due to switching on of the high-beam lamp, and so making it possible to reduce the risk of accidents.

FIG. 2 is a flow chart intended to explain a vehicle high-beam lamp control method according to an embodiment of the present invention.

As illustrated in FIG. 2, in the vehicle high-beam lamp control method according to this embodiment of the present invention, firstly the control unit 30 senses the on state of the passing switch 10 (S210).

If in step S210 the result of sensing the on state of the passing switch 10 is that the passing switch 10 is in the off state, the control unit 30 continues to sense the on state of the passing switch 10.

However, if in step S210 the result of sensing the on state of the passing switch 10 is that the passing switch 10 is in the on state, the control unit 30 lights up, i. e. switches on, the high-beam lamp 40 (S220).

Subsequently, following the switching on of the high-beam lamp 40 in step S220, the control unit 30 counts the switched on time so as to make a judgment as to whether a first set time has been exceeded (S230).

If in step S230 the switched on time has not exceeded the first set time, then the control unit 30 senses the off state of the passing switch 10 (S240).

However, if in step S230 the switched on time has exceeded the first set time, then the control unit 30 outputs an error state via the output unit 50 so as to inform the driver of faulty operation of the passing switch 10 (S250). Here, if an error state is output via the output unit 50, the driver can be informed of the error state of the passing switch 10 by displaying the error state of the passing switch 10 on an instrument cluster (not illustrated) or an infotainment system (not illustrated) of the vehicle.

Next, the control unit 30 extinguishes, i. e. switches off, the high-beam lamp 40 (S260).

In other words, if the passing switch 10 does not turn off such that the first set time is exceeded, then the control unit 30 makes a judgment that the off state of the passing switch 10 has not been recognised due to faulty operation of the passing switch 10 and forcibly switches off the high-beam lamp 40.

In this embodiment, if the first set time is set at 3 seconds, then, following the switching on of the high-beam lamp 40 due to the passing switch 10 being turned on, the high-beam lamp 40 will be switched off if it is not sensed that the passing switch 10 is off even after 3 seconds have been exceeded.

Meanwhile, if in step S240 the result of sensing the off state of the passing switch 10 is that the passing switch 10 continues to be in the on state, the control unit 30 returns to step S220 and maintains the switched on state of the high-beam lamp 40.

However, if in step S240 the result of sensing the off state of the passing switch 10 is that the passing switch 10 is in the off state, the control unit 30 switches off the high-beam lamp 40 (S260).

FIG. 3 is a flow chart intended to explain a vehicle high-beam lamp control method according to another embodiment of the present invention.

As illustrated in FIG. 3, in the vehicle high-beam lamp control method according to this embodiment of the present invention, firstly the control unit 30 senses the on state of the high-beam switch 20 (S310).

If in step S310 the result of sensing the on state of the high-beam switch 20 is that the high-beam switch 20 is in the off state, the control unit 30 continues to sense the on state of the high-beam switch 20.

However, if in step S310 the result of sensing the on state of the high-beam switch 20 is that the high-beam switch 20 is in the on state, the control unit 30 lights up, i. e. switches on, the high-beam lamp 40 (S320).

Subsequently, following the switching on of the high-beam lamp 40 in step S320, the control unit 30 senses the on state of the passing switch 10 (S330).

Normally, the high-beam switch 20 and the passing switch 10 are not used simultaneously, and thus, if the passing switch 10 is turned on when the high-beam switch 20 is in the turned on state, a judgment can be made that the passing switch 10 is being used as a stratagem for resolving faulty operation of the high-beam switch 20.

Consequently, if in step S330 it is sensed that the passing switch 10 has been in the on state continuously for more than a second set time with the high-beam switch 20 in the turned on state, then the control unit 30 switches off the high-beam lamp 40 (S350).

Here, the second set time may be set at 3 seconds or more. In other words, if the on state of the passing switch 10 is continuously sensed for 3 seconds or more with the high-beam switch 20 in the turned on state, then the control unit 30 makes a judgment that, despite the driver having turned the high-beam switch 20 off, the high-beam lamp 40 was not switched off and that as a fallback strategy the passing switch 10 was operated, and so switches off the high-beam lamp 40.

However, if in step S330 the result of sensing the on state of the passing switch 10 is that the passing switch 10 is in the off state, or else that the on state is less than 3 seconds, then the control unit 30 senses the off state of the high-beam switch 20 (S340).

If in step S340 the result of sensing the off state of the high-beam switch 20 is that the high-beam switch 20 continues to be in the on state, the control unit 30 returns to step S320 and maintains the switched on state of the high-beam lamp 40.

However, if in step S340 the result of sensing the off state of the high-beam switch 20 is that the high-beam switch 20 is in the off state, the control unit 30 extinguishes, i. e. switches off, the high-beam lamp 40 (S350).

As described hereinabove, when the vehicle high-beam lamp control method of an embodiment of the present invention is used, a switched on time is set such that the high-beam lamp can be forcibly switched off if the high-beam lamp has not been switched off due to faulty operation of the passing switch on the vehicle or the high-beam lamp can be switched off by means of the passing switch if the high-beam lamp has not been switched off due to faulty operation of the high-beam switch, thereby making it possible to eliminate dazzling of drivers in traffic in front and in oncoming traffic due to switching on of the high-beam lamp, and so making it possible to reduce the risk of accidents.

The present invention has been explained with reference to the embodiments depicted in the drawings, but these are no more than illustrative examples and it will be appreciated that a person skilled in the field of art to which the technology belongs would be capable of various other modified and equivalent embodiments based thereon.

Consequently, the designated scope of protection of the present invention should be defined using the scope of the patent claims hereinbelow.

REFERENCE NUMBERS

10 Passing switch
20 High-beam switch
30 Control unit
40 High-beam lamp
50 Output unit

The invention claimed is:

1. A vehicle high-beam lamp control apparatus comprising:
   a passing switch configured to be turned off after having been turned on by means of a physical force from a user;
   a high-beam switch configured to turn on and off a high-beam lamp; and
   a control unit configured to switch on and off the high-beam lamp in accordance with an on/off state of the passing switch and the high-beam switch, and which is configured to switch off the high-beam lamp if, after the passing switch has been turned on, the passing switch is not turned off such that a first set time is exceeded, and to switch off the high-beam lamp if the passing switch is turned on when the high-beam switch is in the turned on state.

2. The vehicle high-beam lamp control apparatus as claimed in claim 1, wherein the control unit further comprises an output unit configured to output an error state if the high-beam lamp has been switched off because the first set time was exceeded with the passing switch in the on state.

3. The vehicle high-beam lamp control apparatus as claimed in claim 1, wherein the control unit is configured to switch off the high-beam lamp if the passing switch is turned on continuously for more than a second set time when the high-beam switch is in the turned on state.

4. A vehicle high-beam lamp control method comprising:
   at a control unit switching on a high-beam lamp upon sensing an on state of a passing switch;
   following the switching on of the high-beam lamp, at the control unit judging whether a first set time has been exceeded;
   if a result of the judging as to whether the first set time has been exceeded is that the first set time has been exceeded, at the control unit switching off the high-beam lamp; and
   if the result of the judging as to whether the first set time has been exceeded is that the first set time has not been exceeded, at the control unit switching off the high-beam lamp upon sensing that the passing switch is in an off state.

5. The vehicle high-beam lamp control method as claimed in claim 4, wherein the at the control unit switching off the high-beam lamp if the first set time has been exceeded further comprises at the control unit outputting a passing-switch error state.

6. A vehicle high-beam lamp control method comprising:
   at a control unit switching on a high-beam lamp upon sensing an on state of a high-beam switch;
   following the switching on of the high-beam lamp, at the control unit sensing an on state of a passing switch;
   if the result of sensing the on state of the passing switch is that the passing switch is in the on state, at the control unit switching off the high-beam lamp; and
   if the result of sensing the on state of the passing switch is that the passing switch is in an off state, at the control unit switching off the high-beam lamp upon sensing an off state of the high-beam switch.

7. The vehicle high-beam lamp control method as claimed in claim 6, wherein, at the control unit sensing the on state of the passing switch, the on state is sensed when the on state of the passing switch continues for more than a second set time.

8. The vehicle high-beam lamp control apparatus as claimed in claim 2, wherein the control unit is configured to switch off the high-beam lamp if the passing switch is turned on continuously for more than a second set time when the high-beam switch is in the turned on state.

* * * * *